United States Patent
Dowdle et al.

(10) Patent No.: US 12,485,382 B2
(45) Date of Patent: Dec. 2, 2025

(54) AQUEOUS ABSORPTION MEDIUM FOR REMOVAL OF ACID GASES

(71) Applicant: Dow Global Technologies LLC, Midland, MI (US)

(72) Inventors: John R. Dowdle, Lake Jackson, TX (US); Zubin B. Kuvadia, Pearland, TX (US); Amanda M. Goodman, Missouri City, TX (US); Diego E. Cristancho, Lake Jackson, TX (US); Simone T. Lazar, Pearland, TX (US)

(73) Assignee: Dow Global Technologies LLCmi, Midland, MI (US)

( * ) Notice: Subject to any disclaimer, the term of this patent is extended or adjusted under 35 U.S.C. 154(b) by 319 days.

(21) Appl. No.: 18/257,001

(22) PCT Filed: Dec. 14, 2021

(86) PCT No.: PCT/US2021/063188
§ 371 (c)(1),
(2) Date: Jun. 12, 2023

(87) PCT Pub. No.: WO2022/132684
PCT Pub. Date: Jun. 23, 2022

(65) Prior Publication Data
US 2024/0050892 A1    Feb. 15, 2024

Related U.S. Application Data

(60) Provisional application No. 63/126,012, filed on Dec. 16, 2020.

(51) Int. Cl.
*B01D 53/14*    (2006.01)

(52) U.S. Cl.
CPC ..... *B01D 53/1493* (2013.01); *B01D 53/1456* (2013.01); *B01D 2252/20489* (2013.01); *B01D 2252/504* (2013.01); *B01D 2257/504* (2013.01)

(58) Field of Classification Search
CPC ............... B01D 53/14; B01D 53/1425; B01D 53/1456; B01D 53/1475; B01D 53/1493;
(Continued)

(56) References Cited

U.S. PATENT DOCUMENTS 6,852,144 B1 * 2/2005 Wagner .............. B01D 53/1456
                                                              423/242.7
8,318,117 B2    11/2012 Lichtfers et al.
(Continued)

FOREIGN PATENT DOCUMENTS

CN    111185071    3/2022
FR    2969503    6/2012
(Continued)

OTHER PUBLICATIONS

PCT/US2021/063188 International Search Report and Written Opinion with a mailing date of Mar. 25, 2022.

*Primary Examiner* — Duane Smith

(57) ABSTRACT

An aqueous absorption medium for removal of acid gases from a gaseous stream includes at least one tertiary alkanolamine and at least one secondary alkanolamine. A total weight of the at least one tertiary alkanolamine and the at least one secondary alkanolamine account for an amine weight of the aqueous absorption medium. The amine weight of the aqueous absorption medium is from 25 wt % to 65 wt %, based on a total weight of the aqueous absorption medium, and the at least one secondary alkanolamine is present in an amount from 11 wt % to 45 wt %, based on the amine weight of the aqueous absorption medium.

9 Claims, 2 Drawing Sheets

(58) Field of Classification Search
CPC ........ B01D 2257/504; B01D 2252/504; B01D 2252/0478; B01D 2252/0489; B01D 2252/0426; B01D 2252/0431; B01D 2252/0421; B01D 2252/0484
USPC .......... 252/184; 423/228, 229; 95/235, 236, 95/187–194
See application file for complete search history.

(56) References Cited

U.S. PATENT DOCUMENTS

| | | | | |
|---|---|---|---|---|
| 8,476,475 | B2* | 7/2013 | Asprion | B01D 53/1462 423/220 |
| 9,732,298 | B2 | 8/2017 | Laroche et al. | |
| 11,253,811 | B2* | 2/2022 | Dowdle | C10L 3/104 |
| 11,732,206 | B2* | 8/2023 | Allam | C10L 3/103 95/235 |
| 2005/0072524 | A1* | 4/2005 | Mueller | H01L 21/31053 257/E21.244 |
| 2006/0162559 | A1* | 7/2006 | Asprion | B01D 53/1456 95/235 |
| 2010/0105551 | A1* | 4/2010 | Kim | B01D 53/1475 502/401 |
| 2010/0192770 | A1* | 8/2010 | Andarcia | B01D 53/1475 95/173 |
| 2010/0229720 | A1* | 9/2010 | Sonwane | B01D 53/1475 96/6 |
| 2010/0326276 | A1* | 12/2010 | Blair | B01D 53/1462 95/205 |
| 2010/0329953 | A1* | 12/2010 | Blair | B01D 53/1493 252/190 |
| 2011/0116997 | A1* | 5/2011 | Attalla | B01D 53/1425 423/228 |
| 2011/0135549 | A1 | 6/2011 | Lichtfers et al. | |
| 2011/0256043 | A1* | 10/2011 | Blair | B01D 53/1493 252/190 |
| 2012/0161071 | A1* | 6/2012 | Murai | B01D 53/1475 252/189 |
| 2012/0251418 | A1* | 10/2012 | Sieder | B01D 53/1406 423/210 |
| 2012/0308451 | A1* | 12/2012 | Murai | B01D 53/1493 564/462 |
| 2013/0247758 | A1* | 9/2013 | Seiler | C07D 211/58 95/149 |
| 2013/0327983 | A1* | 12/2013 | Blair | B01D 53/1493 252/184 |
| 2014/0138578 | A1* | 5/2014 | Blair | B01D 53/40 252/190 |
| 2014/0290483 | A1* | 10/2014 | Delfort | B01D 53/1481 95/149 |
| 2015/0027055 | A1* | 1/2015 | Kortunov | C10L 3/103 48/127.3 |
| 2015/0027056 | A1* | 1/2015 | Kortunov | B01D 53/1468 48/127.5 |
| 2015/0139877 | A1* | 5/2015 | Weiss | C10L 3/104 252/190 |
| 2015/0141731 | A1* | 5/2015 | Laroche | C10L 3/12 585/860 |
| 2015/0147254 | A1* | 5/2015 | Weiss | B01D 53/52 423/229 |
| 2015/0352484 | A1* | 12/2015 | Closmann | B01D 53/1475 252/184 |
| 2015/0367277 | A1* | 12/2015 | Kim | B01D 53/1475 252/189 |
| 2016/0001220 | A1* | 1/2016 | Higashii | B01D 53/1475 252/189 |
| 2017/0114001 | A1* | 4/2017 | Atkins | C07C 209/80 |
| 2017/0282116 | A1* | 10/2017 | Ingram | B01D 53/1425 |
| 2018/0222847 | A1* | 8/2018 | Ingram | C10L 3/104 |
| 2018/0272270 | A1* | 9/2018 | Ingram | B01D 53/1493 |
| 2018/0290101 | A1 | 10/2018 | Dugas et al. | |
| 2018/0304191 | A1* | 10/2018 | Ingram | C10L 3/101 |
| 2019/0126193 | A1* | 5/2019 | Ingram | B01D 53/1493 |
| 2019/0126194 | A1* | 5/2019 | Ingram | C10L 3/104 |
| 2020/0164303 | A1* | 5/2020 | Ernst | C07C 213/02 |
| 2021/0046418 | A1* | 2/2021 | Van de Vyver | B01D 53/1493 |
| 2021/0213383 | A1 | 7/2021 | Sieder et al. | |
| 2022/0152551 | A1* | 5/2022 | Ernst | B01D 53/1425 |
| 2022/0161224 | A1* | 5/2022 | Baek | B01J 20/261 |
| 2024/0042375 | A1* | 2/2024 | Holcombe | C07C 323/12 |
| 2024/0050892 | A1* | 2/2024 | Dowdle | B01D 53/1456 |

FOREIGN PATENT DOCUMENTS

| | | | |
|---|---|---|---|
| FR | 2969504 | 11/2014 | |
| JP | 2019006903 | 1/2019 | |
| WO | WO2017189297 | * 11/2017 | ............ B01D 53/96 |
| WO | WO2018146233 | * 8/2018 | ......... B01D 53/1468 |
| WO | WO2018160206 | * 9/2018 | .............. C10L 3/103 |
| WO | WO2023091384 | * 5/2023 | ............... C10K 1/10 |

* cited by examiner

AQUEOUS ABSORPTION MEDIUM FOR REMOVAL OF ACID GASES

FIELD

Embodiments relate to an aqueous absorption medium for removal of acid gases that includes at least one tertiary alkanolamine and at least one secondary alkanolamine, and a process for removal of acid gases that includes providing the aqueous absorption medium.

INTRODUCTION

Gaseous streams may contain acid gases such as carbon dioxide, hydrogen sulfide, sulfur dioxide, carbon disulfide, hydrogen cyanide, carbonyl sulfide, and/or mercaptans as impurities. The gaseous streams may be derived from natural gas, petroleum, synthesis gas, biogases, or coal processing. For example, the gaseous streams may include natural gas, refinery gas, hydrocarbon gases from shale pyrolysis, ammonia synthesis gas, flue gas, and/or liquefied natural gas.

Aqueous amine based absorption media are probably the most common absorbents for removing acid gases. However, improved amine based aqueous absorption media for removal of acid gases are sought, both in an effort to minimize costs and maximize acid gas removal.

SUMMARY

Embodiments may be realized by providing an aqueous absorption medium for removal of acid gases from a gaseous stream, including (a) at least one tertiary alkanolamine having the general formula (I)

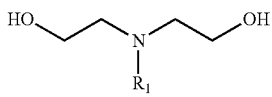

(I)

where $R_1$ is a $C_1$ to $C_4$ alkyl,
(b) at least one secondary alkanolamine having the general formula (II)

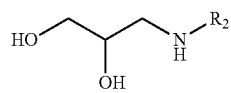

(II)

where $R_2$ is a $C_1$ to $C_4$ alkyl, and
(c) water.

A total weight of the at least one tertiary alkanolamine and the at least one secondary alkanolamine account for an amine weight of the aqueous absorption medium. The amine weight of the aqueous absorption medium is from 25 wt % to 65 wt %, based on a total weight of the aqueous absorption medium, and the at least one secondary alkanolamine is present in an amount from 11 wt % to 45 wt %, based on the amine weight of the aqueous absorption medium.

BRIEF DESCRIPTION OF THE DRAWINGS

Features of the embodiments will become more apparent to those of ordinary skill in the art by describing in detail exemplary embodiments thereof with reference to the attached drawings in which.

DETAILED DESCRIPTION

Figure 1:
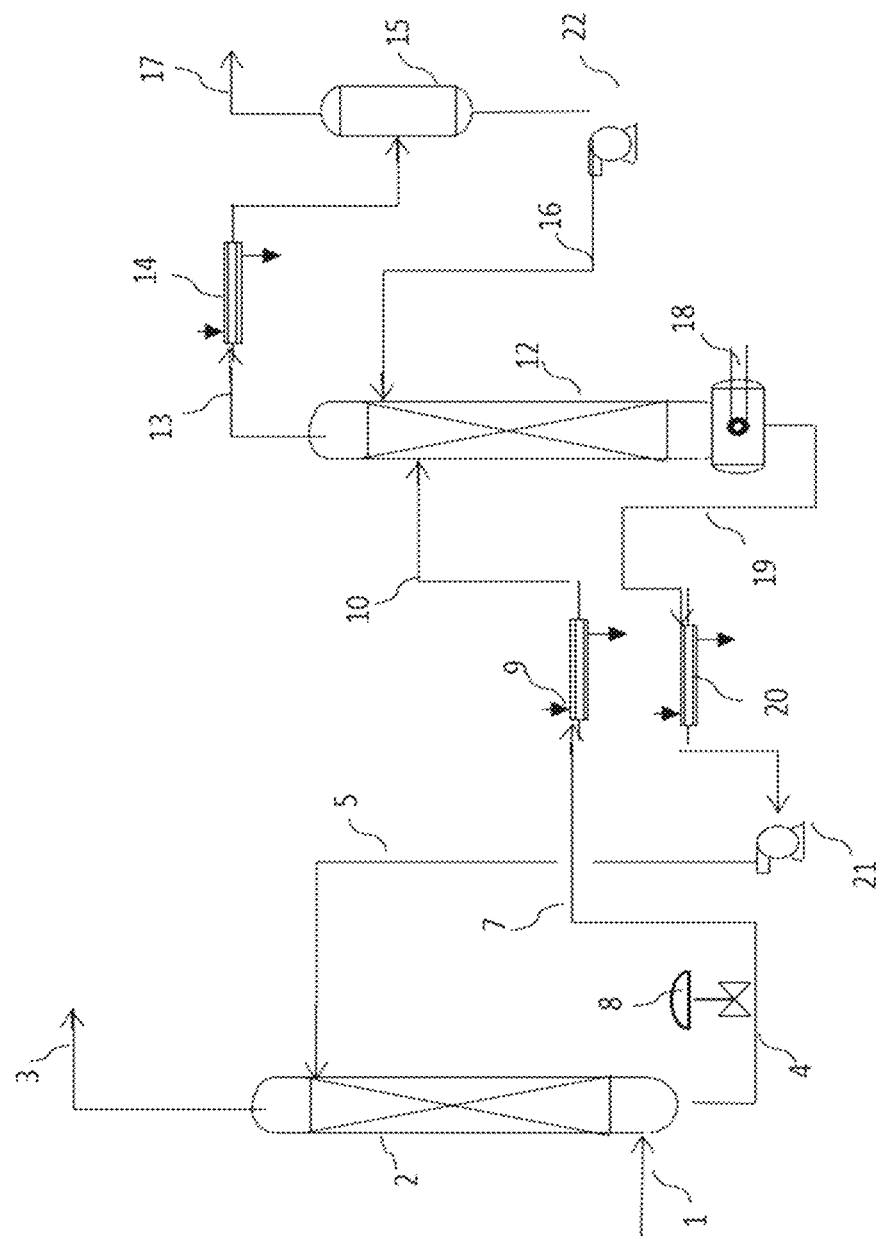
FIG. 1 illustrates an exemplary process diagram.

Aqueous absorption media that include tertiary alkanolamines for acid gas removal may include at least one activator in a sufficient amount that may help accelerate a reaction rate and hence removal of acid gases such as carbon dioxide from a gaseous stream. Without intending to be bound by theory, it is believed that without a sufficient amount of the activator, an aqueous absorption medium that includes the tertiary alkanolamine may not efficiently remove carbon dioxide. Further, for cost management reasons and to minimize process concerns, it is desirable for optimal performance that the aqueous absorption medium not require relatively high concentrations (by weight and/or mole percent) of the activator compared to the at least one tertiary alkanolamine and/or water. As such activators are sought that allow for efficient removal of acid gases such as carbon dioxide at relatively low concentrations.

It is desirable to maintain the amount of activator relative to the at least one tertiary alkanolamine as low as possible, while still being effective. For example, a weight ratio of the activator to the at least one tertiary alkanolamine may be less than 1 (e.g., in a 55 wt % amine solution, if the total activator concentration is 25 wt % the tertiary alkanolamine concentration could be 30 wt %). In this regard, it may be desirable to use relatively small amounts of the activator since the heat of absorption of activators tend to be high compared to tertiary alkanolamines such as MDEA, which high heat of absorption may result in increased cost of regenerating the aqueous absorption medium (e.g., OPEX) such as because more energy may be required for the regeneration process and/or a high loss of amine may be realized during the absorption process. By reaction rate it is meant the moles of carbon dioxide consumed per unit volume per unit time in the aqueous absorption medium, and it is understood the presence of the activator can highly influence the reaction rate.

With respect to aqueous absorption medium, when the medium includes a tertiary alkanolamine such as methyldiethanolamine (MDEA), a common activator is piperazine. Further, it is preferable that the activator is a secondary amine, as primary amines such as aminoethoxyethanol (AEE) may corrode and degrade in gas treating application and tertiary amines typically are not good activators. However, the reaction rate of piperazine in gas treating end use applications can be too fast and/or the piperazine itself can be too volatile. When piperazine is too fast reacting, an alternative choice is methylethanolamine (NMEA).

Blends of MDEA/NMEA are often used in refinery gas treating applications, but based on the low boiling point of NMEA it is not an optimal choice. For example, a low boiling point is often a problem in these gas treating applications since it can lead to high losses of the activator relative to the MDEA base in the solvent/aqueous absorption medium, especially during absorption. Such higher losses of the activator relative to the base amine can lead to significant process issues such as difficulty in maintaining an optimal aqueous absorption medium composition. As such, alternatives are sought that allow for relatively high reaction rates while minimizing process issues.

Further, blends that include diethanolamine (DEA), such as MDEA/DEA have been proposed, as DEA has an average normal boiling point that is similar to that of MDEA.

However, it is known that the reaction rate of DEA is substantially lower than that of NMEA, thus making DEA less desirable for removing carbon dioxide from gaseous mixtures in an efficient process.

According to exemplary embodiments, the activator for the aqueous absorption medium, which allows for high reaction rates at low concentrations, relatively low processing costs, and is not known for higher concerns with respect to corrosion/degradation issues, are secondary amines having a structure similar to methylaminopropanediol (MAPD). MAPD and like structures are believed to be usable in blends with MDEA and like structures as an efficient aqueous absorption medium for acid gas removal from gaseous mixtures. MAPD and the like structures are similar to NMEA in that the hydroxyl group(s) are on one end of the molecule, as opposed to DEA and MDEA. This structure allows for an alkylated nitrogen group structure on the other end of the molecule. Without intending to be bound by this theory, it is believed that the interaction between the combination of both the multiple hydroxyl groups on one end of the molecule and the alkylated nitrogen group structure on the opposing end render MAPD and like structures a well-suited choice to use as an activator.

Aqueous Alkanolamine Medium

According to exemplary embodiments, the aqueous absorption medium for removal of acid gases from a gaseous stream includes at least one tertiary alkanolamine for acid gas removal and at least one secondary alkanolamine as an activator in a sufficient amount to increase the reaction rate for improved acid gas removal, while minimizing other concerns, in comparison to when the at least one tertiary alkanolamine is used without such an activator in a sufficient amount or when a less desirable amine is used. The aqueous absorption medium may exclude other amines that can be too volatile such as piperazine and/or other amines that have low normal boiling points such as NMEA.

The at least one tertiary alkanolamine has the general formula (I):

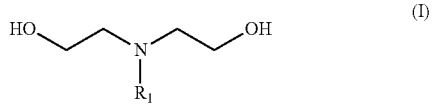

(I)

where $R_1$ is a $C_1$ to $C_4$ alkyl, e.g., a linear $C_1$ to $C_4$ alkyl. By $C_1$ to $C_4$ alkyl it is meant an alkyl group that includes 1 to 4 carbon atoms. Examples include —$CH_3$, —$CH_2CH_3$, —$(CH_2)_2CH_3$, and —$(CH_2)_3CH_3$ (e.g., linear). The aqueous absorption medium may include one or more different tertiary alkanolamines that each has the general formula (I). The above general formula (I) encompasses MDEA and like structures that are believed to have similar properties for use in acid gas removal from gaseous mixtures.

The at least one secondary alkanolamine as an activator has the general formula (II):

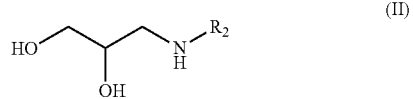

(II)

where $R_2$ is a $C_1$ to $C_4$ alkyl, e.g., a linear $C_1$ to $C_4$ alkyl. By $C_1$ to $C_4$ alkyl it is meant an alkyl group that includes 1 to 4 carbon atoms. Examples include —$CH_3$, —$CH_2CH_3$, —$(CH_2)_2CH_3$, and —$(CH_2)_3CH_3$ (e.g., linear). The aqueous absorption medium may include one or more different secondary alkanolamines that each has the general formula (II). The above general formula (II) encompasses MAPD like structures that are believed to have similar properties for use as an activator in acid gas removal from gaseous mixtures Exemplary embodiments include $R_1$ in general formula (I) being $C_1$ alkyl and/or $R_2$ in general formula (II) being the $C_1$ alkyl.

The aqueous absorption medium further includes water. The aqueous absorption medium may further include at least one physical solvent, such as physical solvents known in the art. Exemplary physical solvents include methoxytriglycol (MTG), sulfolane, glycerol, methanol, ethylene glycol, diethylene glycol, and triethylene glycol.

The total weight of the at least one tertiary alkanolamine and the at least one secondary alkanolamine present in the aqueous absorption medium account for an amine weight of the aqueous absorption medium (e.g., dry amine weight of the aqueous absorption medium). Said in another way, the amine weight of the aqueous absorption medium consists of the total weight of the at least one tertiary alkanolamine and the total weight of at least one secondary alkanolamine present in the aqueous absorption medium and does not include any other additives, water, or physical solvents. In exemplary embodiments, the remainder of the total weight of the aqueous absorption medium, exclusive of the amine weight of the aqueous absorption medium, is water.

The amine weight of the aqueous absorption medium accounts for 25 wt % to 65 wt % (e.g., 25 wt % to 60 wt %, 30 wt % to 55 wt %, 30 wt % to 50 wt %, 40 wt % to 55 wt %, 45 wt % to 55 wt %, etc.) of a total weight of the aqueous absorption medium. The amount of the at least one secondary alkanolamine may be based on the total weight of the amine weight of the aqueous absorption medium. In embodiments, the at least one secondary alkanolamine is present in an amount from 11 wt % to 45 wt % (e.g., 11 wt % to 40 wt %, 11 wt % to 35 wt %, 11 wt % to 30 wt %, 11 wt % to 25 wt %, 12 wt % to 20 wt %, etc.), based on the amine weight of the aqueous absorption medium.

The amount of at least one secondary alkanolamine may be further based on the total weight of the aqueous absorption medium. For example, the at least one secondary alkanolamine may be present in an amount from 5 wt % to 25 wt % (e.g., from 5 wt % and 20 wt %, from 5 wt % to 15 wt %, from 6 wt % to 20 wt %, from 6 wt % to 15 wt %, from 6 wt % to 11 wt %, etc.), based on a total weight of the aqueous absorption medium. As the at least one secondary alkanolamine is present as an activator, it is present in an amount less than the at least one tertiary alkanolamine and/or water. For example, the total weight percentage of the least one secondary alkanolamine in the aqueous absorption medium is less than the total weight percentage of the at least one tertiary alkanolamine and the total weight percentage of the water (based on a total of 100 wt % for the aqueous absorption medium).

In exemplary embodiments, the at least one tertiary alkanolamine may be present in an amount from 25 wt % to 60 wt % (e.g., 25 wt % to 55 wt %, 30 wt % to 55 wt %, 35 wt % to 55 wt %, 35 wt % to 50 wt %, 39 wt % to 45 wt %, etc.) based on the total weight of the aqueous absorption medium.

Application

Acid gas removal from primarily gaseous streams may take place in gas-liquid contacting equipment (such as such as Pressure Swing Absorption (PSA) and Temperature Swing Absorption (TSA) using liquid absorbents). Loss of amine due to volatility may be a concern in gas-liquid separation. Volatility may be of particular concern when components of the aqueous absorption medium such an activator has a relatively low boiling point in comparison to commonly used base tertiary alkanolamines. As such, it has been found that for aqueous absorption media that include least one tertiary alkanolamine and least one secondary alkanolamine as an activator, it may be useful for both to have relatively high boiling points (e.g., similar boiling points of at least 230° C.). It is noted, while a low boiling point does imply a high volatility in gas treating application, it does not necessarily imply a high solubility in liquid hydrocarbon media. In other words volatility and hydrocarbon co-solubility are different principles and in this instance the concern is volatility. In this regard, amines that are highly volatile tend to be impractical and costly for acid gas treating of a gaseous stream.

A process for removal of acid gases from a gaseous stream includes providing the gaseous stream for acid gas removal treatment and the aqueous absorption medium. In the process for removal of acid gases, the aqueous absorption medium may contact the gaseous mixture comprising the acidic gases counter currently at low temperature and high pressure in an absorber tower to form an acid gas rich aqueous absorption medium. Cyclic sorption processes may use high rates of gas-liquid exchange, the transfer of large liquid inventories between the absorption and regeneration steps, and high energy requirements for the regeneration of amine solutions. Such processes may utilize a large temperature differential in the gas stream between the absorption and desorption (regeneration) parts of the cycle. For example, aqueous amine scrubbing methods may use relatively low temperatures, e.g., less than 50° C., for acid gas uptake with an increase to a temperature to above about 100° C., e.g., 120° C. or higher, for the desorption.

Regeneration enables at least partially removing acid gases from the acid gas rich aqueous absorption medium to form an acid gas lean aqueous absorption medium. Regeneration of large quantities of aqueous absorption medium to form an acid gas lean aqueous absorption medium may be at temperatures above 100° C., such that many commonly used amines may suffer significant amine loss due to vaporization in the temperature swing processes. As such, it is desirable to use amines that minimize such losses. After regeneration, the acid gas lean aqueous absorption medium can be recycled back into the acid gas removal process for reuse in the removal of acid gases from the gaseous stream.

The gaseous streams that may be treated for acid gas removal include industrial gases, such as natural gases produced from hydrocarbon reservoirs, coal processing, biogases, and refinery gases.

EXAMPLES

Approximate properties, characters, parameters, etc., are provided below with respect to the illustrative working examples, comparative examples, and the information used in the reported results for the working and comparative examples.

The process for treating the gaseous stream is based on that shown in FIG. 1, in which the aqueous absorption medium can be fed via feed line 5 into an upper portion of a gas-liquid countercurrent packed-bed (¼" ceramic Intalox saddles) absorption column 2. The gaseous stream can be introduced through feed line 1 into the lower portion of absorption column 2 at a gas flow rate of approximately 17 standard liter per minute. The dry feed composition is 90 mol % nitrogen and 10 mol % carbon dioxide. The pressure in the absorption column is to be set to approximately 250 psig. The clean gas (i.e., reduced amounts of $CO_2$) is discharged at the top of the absorption column 2 through outlet line 3 and residual $CO_2$ levels are measured by gas chromatography. The aqueous absorption medium that is rich with $CO_2$ flows toward the lower portion of the absorption column 2 and leaves via line 4.

The rich aqueous absorption medium in line 4 can be reduced in pressure by the level control valve 8 and flow through line 7 to heat exchanger 9, which can heat the rich aqueous absorption medium. Then, the heated rich aqueous absorption medium can enter an upper portion of a regenerator 12 via line 10. The regenerator 12 is equipped with random packing (¼" Pro-Pak®) that can effect desorption of the $H_2S$ and $CO_2$. The pressure of the regenerator is to be set at approximately 27 psia. The gases from the regenerator 12 can then be passed through line 13 into condenser 14, where cooling and condensation of any residual water and amine can occur. The gases then can enter a separator 15, where the condensed liquid can be separated from the vapor phase. The condensed aqueous solution can be pumped via pump 22 through line 16 to an upper portion of the regenerator 12. The gases remaining from the condensation can be removed through line 17 for final collection and/or disposal. The regenerated aqueous solution is to flow down through the regenerator 12 and the close-coupled reboiler 18. The reboiler 18, which is equipped with an electrical heating device, can vaporize a portion of the aqueous solution to drive off any residual gases. The reboiler temperature may be set to approximately 125° C. The vapors may rise from the reboiler and be returned to the regenerator 12, which can comingle with falling liquid and then exit through line 13 for entry into the condensation stage of the process. The regenerated aqueous absorption medium from the reboiler 18 can leave through line 19 and be cooled in a heat exchanger 20. Then, the regenerated (i.e., acid gas lean) aqueous absorption medium can be pumped via pump 21 back into absorber 2 through solvent feed line 5.

The following materials can be principally used in the Examples:

| | |
|---|---|
| MDEA | Refers to a solution of approximately 98% of the tertiary alkanolamine methyldiethanolamine available from The Dow Chemical Company or affiliated company and having the following structure: |

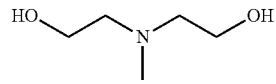

| | |
|---|---|
| MAPD | Refers to a solution of approximately 98% of the secondary alkanolamine methylaminopropanediol available from The Dow Chemical Company or affiliated company and having the following structure: |

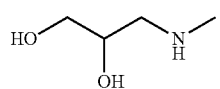

| | |
|---|---|
| NMEA | Refers to a solution of approximately 98% of secondary alkanolamine methylethanolamine available from The Dow Chemical Company or affiliated company and having the following structure: 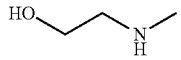 |

Referring to the examples in Table 1, below, a comparison is made with respect to acid gas removal performance of MDEA-MAPD blends versus a commonly used MDEA-NMEA blend. Whereas, while NMEA is a monohydric secondary alkanolamine, it has a significantly lower average normal boiling point compared to MAPD, which is a dihydric secondary alkanolamine Further, the examples are set at 50 wt % of water, as that is a typical target for maximizing capacity for acid gases while minimizing corrosion and processing issues, but it is well known that the total amine content (hence amount of water) can be varied based on the intended use and type of materials used in a specific gas treating facility. By Activator/Total Amine it is meant a percentage by weight of the activator (i.e., MAPD or NMEA) to the amine weight in the aqueous absorption medium (i.e., exclusive of the weight of water).

TABLE 1

| | Working Example 1 | Working Example 2 | Comparative Example A | Comparative Example B |
|---|---|---|---|---|
| Composition (wt %) | | | | |
| MDEA | 43 | 40 | 45 | 45 |
| MAPD | 7 | 10 | 0 | 5 |
| NMEA | 0 | 0 | 5 | 0 |
| Water | 50 | 50 | 50 | 50 |
| Blend Properties | | | | |
| Activator/Total Amine (wt %) | 14 | 20 | 10 | 10 |
| Tested Properties | | | | |
| Flow Rate to achieve 2 mol % $CO_2$ Removal (kg/hr) | 2.2 | 2.1 | 2.6 | 4.1 |

The examples in Table 1 are based on treating the feed gas (i.e., feed line 1 in FIG. 1), which enters the absorption column 2 with a carbon dioxide content of 10 mol %. The goal is to remove enough carbon dioxide in the absorber column 2 to achieve a 2 mol % carbon dioxide concentration in the treated gas (i.e., outlet line 3 in FIG. 1). Referring to FIG. 1, with respect to Flow Rate for $CO_2$ removal, it is desired to achieve 2 mol % of $CO_2$ removal from a gaseous stream with a flowrate of aqueous absorption medium (i.e., solvent) as low as possible (e.g., less than 2.5 kg/hr) while using a relatively low amount of the activator.

Figure 2:
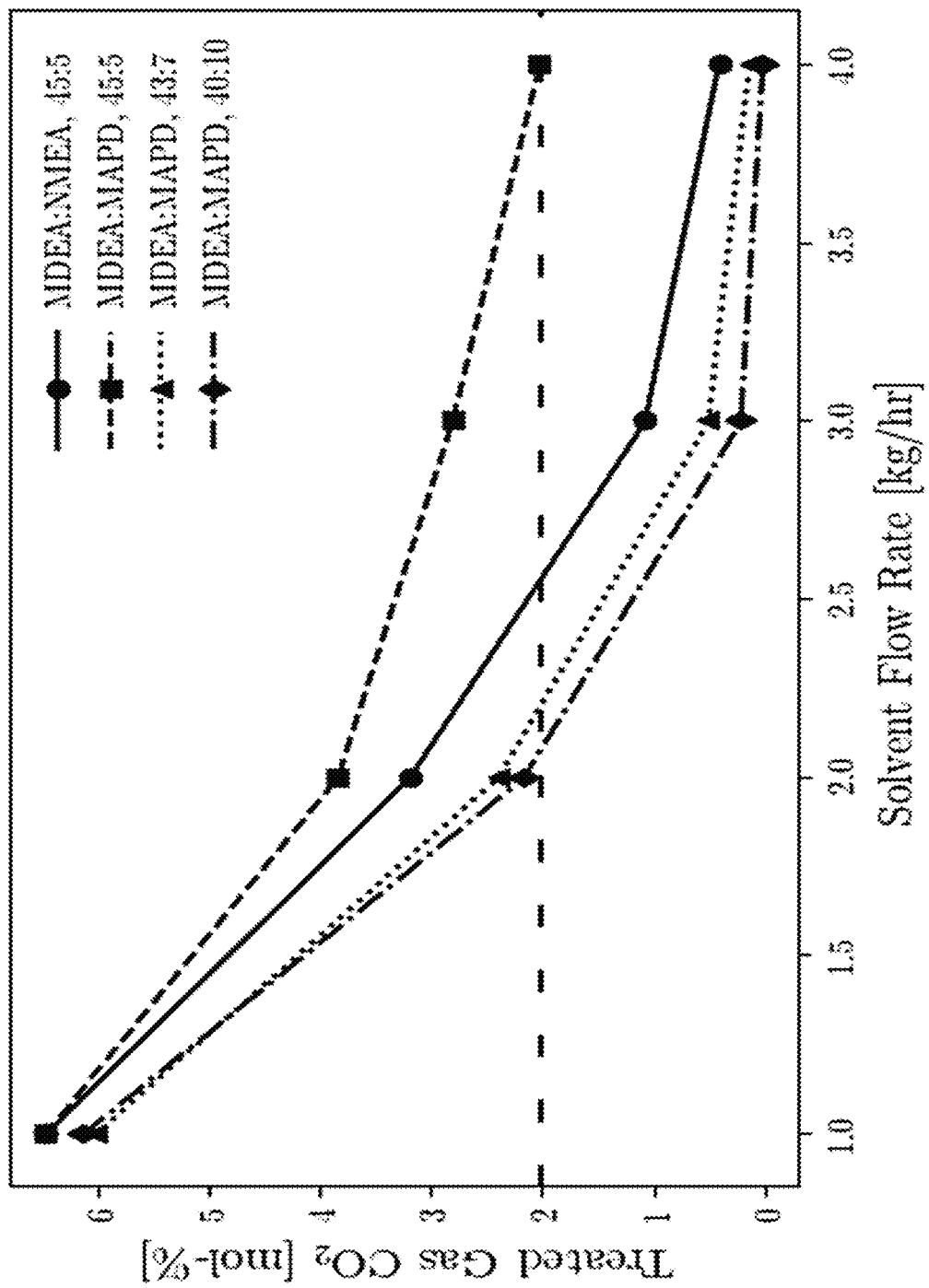
FIG. 2 illustrates performance data for Working Examples 1 and 2 and Comparative Examples A and B.

Referring to FIG. 2, with respect to Working Examples 1 and 2, it is shown a desirable low flow rate is achievable. In contrast, for Comparative Examples A and B, the flow rate is higher than 2.5. kg/hr. In particular, as shown in the data provided in FIG. 2 with respect to Solvent Flow Rate (i.e., in solvent feed line 5) vs. Treated Gas $CO_2$ (i.e., in the gaseous stream in outline line 3), Working Examples 1 and 2 (i.e., data for MDEA-MAPD (43:7) and MDEA-MAPD (40:10)) both can achieve the threshold of 2.0 mol % (20,000 ppmv) of Treated Gas $CO_2$ at flowrates less than 2.5 kg/hr. In particular, FIG. 2 shows the potential results for removing $CO_2$ from a feed gas stream composed of 90 mol % nitrogen and 10 mol % $CO_2$. It is desired to reach a 2 mol % or less of $CO_2$ specification in the treated gaseous stream (i.e., treated gas) with a solvent circulation rate that is as low as possible.

Referring to FIG. 2, the amount of carbon dioxide removed is directly proportional to how fast it is absorbed, which may be determined by: (i) the reaction rate of carbon dioxide with the activator, (ii) the activator concentration, and (iii) the solvent flowrate. Further it is shown that for equimolar 2 mol % solutions (5 wt % NMEA and 7 wt % MAPD), improved carbon dioxide removal can be realized with MAPD/MDEA than with NMEA/MDEA at the same flowrate.

Thus, it is believed MAPD has a comparatively fast reaction rate. It is surprising that for the examples containing equimolar amounts of NMEA and MAPD, the MAPD solution would perform better than the NMEA solution as it is expected that the additional hydroxyl would make the performance somewhat worse.

Further, the only solvent blends capable of reaching sufficient carbon dioxide removal at relatively low flow rates are the MDEA/MAPD blends with 7 wt % and 10 wt % MAPD. Further, while MDEA/NMEA blend containing 5 wt % NMEA can potentially achieve a solvent circulation rate around 3.0 kg/hr, it is not desirable to use the MDEA/NMEA blend in practice because NMEA is too volatile at process conditions as it has an average boiling point of approximately 158° C., which can lead to high rates of solvent loss and high operational costs. In contrast, MAPD does not have the same volatility issue and has a significantly higher average boiling point of approximately 249° C. Further, it is noted the average boiling point of MDEA is similarly approximately 247° C. Further, referring to Working Example 2, it is shown that increases in MAPD concentration also offer similar benefits.

With respect to the above, it is seen that certain MDEA/MAPD blends may perform better than the MDEA/NMEA blend, such as by using a lower circulation rate of the aqueous absorption medium to meet the specification for removal of acid gases such as carbon dioxide. It is believed that MAPD as an activator compared to NMEA may not hinder the reaction with an acid gas such as $CO_2$ and may the result in reaction rate that is sufficiently fast to enable MAPD to act as a high-performance absorption medium for acid gas removal.

Accordingly, it has been found that MDEA/MAPD blends in aqueous absorption medium, in which MAPD is present in an amount greater than 5 wt % for a 50 wt % amine solvent, may provide baseline performance with respect to carbon dioxide removal at a flowrate less than 2.5 kg/hr, while minimizing the amount of the higher cost MAPD activator needed in the blend and minimizing issues with respect to volatility.

The invention claimed is:

1. An aqueous absorption medium for removal of acid gases from a gaseous stream, comprising:
   (a) at least one tertiary alkanolamine having the general formula (I)

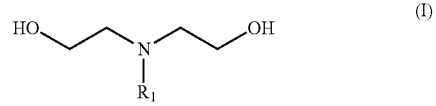

where $R_1$ is a $C_1$ to $C_4$ alkyl,
(b) at least one secondary alkanolamine having the general formula (II)

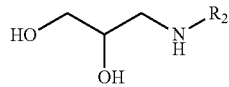

where $R_2$ is a $C_1$ to $C_4$ alkyl, and
(c) water,
wherein a total weight of the at least one tertiary alkanolamine and the at least one secondary alkanolamine account for an amine weight of the aqueous absorption medium, the amine weight of the aqueous absorption medium being from 25 wt % to 65 wt %, based on a total weight of the aqueous absorption medium, and the at least one secondary alkanolamine being present in an amount from 11 wt % to 45 wt %, based on the amine weight of the aqueous absorption medium.

2. The aqueous absorption medium as claimed in claim 1, wherein the least one tertiary alkanolamine is present in an amount from 25 wt % to 55 wt %, based on the total weight of the aqueous absorption medium.

3. The aqueous absorption medium as claimed in claim 1, wherein the amount of the at least one secondary alkanolamine is from 11 wt % to 20 wt %, based on the total weight of the aqueous absorption medium.

4. The aqueous absorption medium as claimed in claim 1, wherein $R_1$ is a $C_1$ alkyl.

5. The aqueous absorption medium as claimed in claim 1, wherein $R_2$ is a $C_1$ alkyl.

6. The aqueous absorption medium as claimed in claim 1, wherein $R_1$ is a $C_1$ alkyl and $R_2$ is a $C_1$ alkyl.

7. The aqueous absorption medium as claimed in claim 1 wherein piperazine and methylethanolamine are excluded from the aqueous absorption medium.

8. A process for removal of acid gases from a gaseous stream, comprising providing the gaseous stream and the aqueous absorption medium as claimed in claim 1.

9. The process as claimed in claim 8, further comprising:
forming an acid gas rich aqueous absorption medium by allowing the gaseous stream and the aqueous absorption medium to come into contact, and
at least partially removing acid gases from the acid gas rich aqueous absorption medium to form an acid gas lean aqueous absorption medium, and
recycling the acid gas lean aqueous absorption medium for further removal of acid gases from the gaseous stream.

\* \* \* \* \*